United States Patent [19]
Schweidler

[11] 3,865,360
[45] Feb. 11, 1975

[54] VISE

[75] Inventor: Erich Schweidler, Kempten, Germany

[73] Assignee: Saver-Allma GmbH, Allgaver Maschinenbau, Kempten, Germany

[22] Filed: Oct. 19, 1973

[21] Appl. No.: 407,866

[30] Foreign Application Priority Data
Oct. 25, 1972  Germany............................ 2252269

[52] U.S. Cl............... 269/100, 269/70, 269/81
[51] Int. Cl.............................................. B23q 3/06
[58] Field of Search.............. 269/70, 81, 95, 97, 99, 269/100, 101, 321 LU

[56] References Cited
UNITED STATES PATENTS

| | | | |
|---|---|---|---|
| 1,371,617 | 3/1921 | Germanow............................ | 269/95 |
| 1,537,958 | 5/1925 | Marshall............................... | 269/81 |
| 2,106,525 | 1/1938 | Henry................................... | 269/70 |
| 2,430,366 | 11/1947 | Porterfield............................ | 269/95 |
| 2,978,966 | 4/1961 | Swenson............................. | 269/100 |
| 3,024,018 | 3/1962 | Manz.................................... | 269/97 |
| 3,441,264 | 4/1969 | Gaston................................. | 269/97 |

*Primary Examiner*—Roy Lake
*Assistant Examiner*—Mark S. Bicks
*Attorney, Agent, or Firm*—Woodhams, Blanchard & Flynn

[57] ABSTRACT

A machine vise has a base plate which rests directly on a grooved machine table and is rotatable about a bearing collar secured by a vertical screw to the machine table, being fastened in any desired position by paws which engage laterally-projecting rails on the edge of the base plate and are screwed to blocks fitted in the grooves of the machine table. A spring-loaded stop engaging a gear ring fixed to the bearing collar serves to locate the base plate in the desired angular position and the base plate can be further clamped in position by a screw ring on the bearing collar.

8 Claims, 4 Drawing Figures

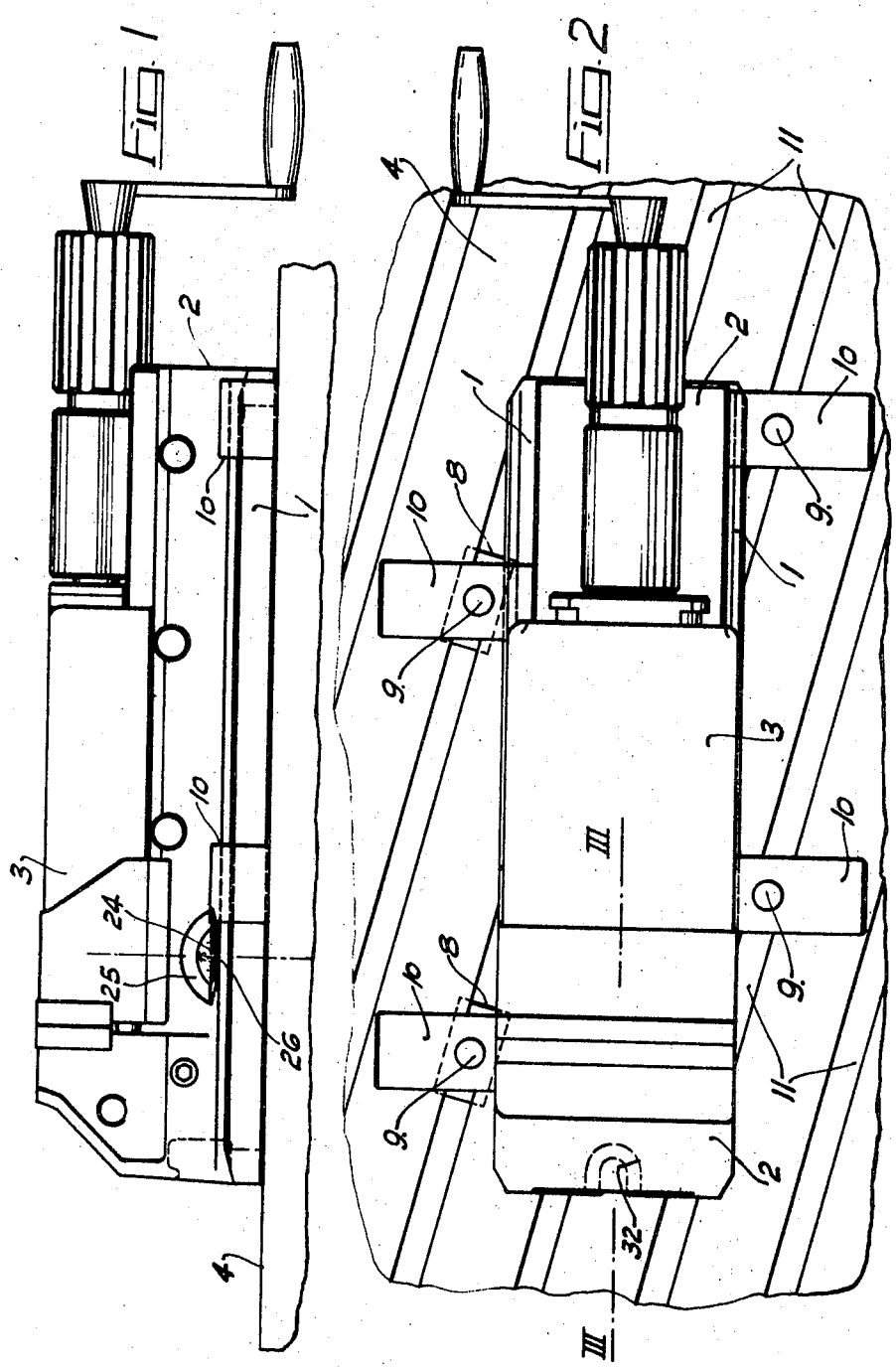

VISE

FIELD OF THE INVENTION

The invention relates to a machine vise which can be swivelled and locked on a machine table at different angular positions about a vertical axis.

BACKGROUND OF THE INVENTION

In order to make it possible to swivel the vise between different angular positions, it has been necessary up till now to have a swivel plate which has to be fixed with several screws on to the machine table. To this swivel plate, the base plate of a machine vise is fastened by several clamping screws, whereby ring-shaped grooves are provided for these clamping screws in the swivel plate in order to bring the machine vise on the swivel plate into different angular positions.

This elevated positioning of the vise on a swivel-plate where the base plate of the vise in addition rests only partially on the swivel-plate, entails appreciable loss of stability, so that a clamped work-piece cannot be subjected to very high cutting pressures by a cutting tool, thus affecting the precision of the machining operation. Besides this, considerable labour and material costs are required for the heavy swivel-plate, whose heavy weight also entails difficult manipulation. Furthermore, the swivelling and adjustment to definite angles is troublesome with this type of vise.

The invention is based on the problem of avoiding the above-mentioned faults and providing a machine vise rotatable to any given angle and capable of being locked in position, which has high stability and is considerably simplified in construction and manipulation.

In order to solve this problem there is provided a machine vise of the type described above, characterised according to the invention by a vise base plate directly locatable on the machine table with laterally-projecting edge rails, a bearing collar, vertically positioned in the base-plate, round which the base-plate can be swivelled, a clamping screw located in the bearing collar freely accessible from above and capable of being screwed into a groove-block of the machine table to clamp the bearing collar firmly on to the machine bed, and holding screws in groove-blocks of the machine bed which cooperate with clamping paws on the edge rails of the baseplate to clamp the latter in any desired angular position on the machine table.

In this novel machine vise the hitherto required swivel-plate is omitted. Since the machine vise rests directly with its baseplate on the machine table and is tightly fastened to it, this vise has very high stability, which renders possible very high cutting pressures of a swarf-removing tool, and also high precision machining.

The invention is described below with reference to an embodiment shown in the drawings in which:

FIG. 1 is a side view of a machine vise fixed on the machine table;

FIG. 2 is a related plan view of the vise which is clamped at an angle to the grooves of the machine table;

DETAILED DESCRIPTION

Figure 3:
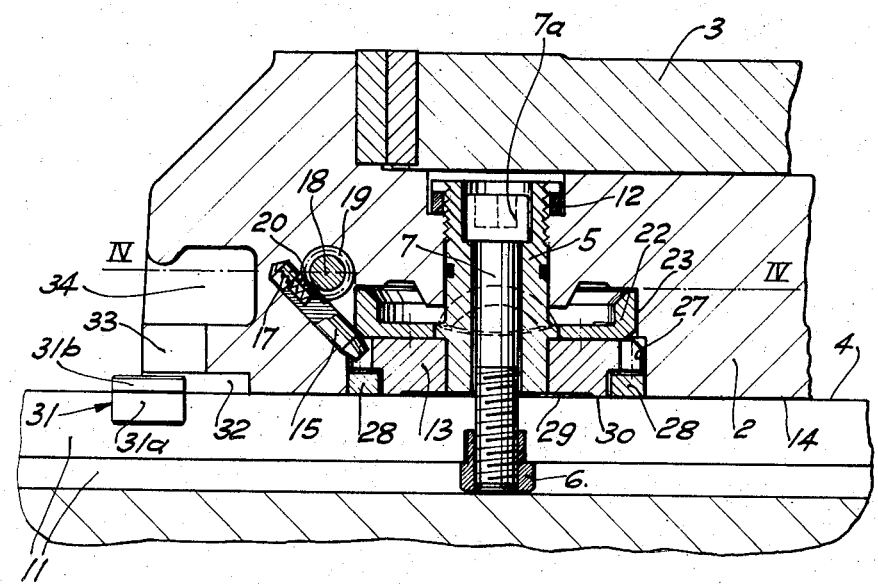
FIG. 3 is a vertical partial section taken on line III/III of FIG. 2, machine vise in the zero-angle position on the the machine table.

The drawings represent a machine vise having base-plate 2 with laterally-projecting edge rails 1 and carriage 3. In order to provide high holding tension for this vise and thereby ensure high cutting pressures, it may be provided with a mechanical or hydraulic pressure intensifier. The machine vise according to the invention is positioned with its base plate 2 directly on the machine table 4, and has a vertical bearing collar 5 (FIGS. 3 and 4) fitted vertically in the base plate and about which the base plate is rotatable, and further a clamping screw 7 fitted in this bearing collar which can be screwed into a groove-block 6 for clamping the bearing collar 5 on to the machine table. Further, according to FIGS. 1 and 2 there are provided tightening screws 9 that can be screwed into the groove-block 8 of the machine table, which connect with the clamping paws 10 on the edge rails 1 of the base plate 2 and clamp the latter in any desired angular position with respect to the T-grooves 11 on the machine table. In these grooves the groove-blocks 6 or 8 slide freely in a known manner.

In addition, the base-plate 2 can slide vertically to a slight extent on the bearing collar 5 and at the upper end of the bearing collar there is provided an external thread having an outer screw-ring or nut 12, threadedly engaged therewith and resting on the base plate, which serves to press the base plate down on to the machine table. Advantageously there is further provided a gear rim 13 tightly connected to the bearing collar 5 and having its under side resting on the machine table 4, which under side (see FIG. 4) is nearly flush with the under side 14 of the base plate, and there is further a stop member 15 movably fitted in the base plate 2 which engages in the toothing grooves 16 of the gear rim. This gear rim together with the stop member 15 makes possible the exact fixing of the base plate 2 at definite angular position, e.g., 15°, 30°, etc. In the advantageous embodiment shown there is provided as stop member 15 a longitudinally-movable stop bolt loaded with a compressed spring 17, and at right angles to this a swivel-bolt 18 rotatably mounted in the base plate 2 and having a pinion-type toothing 19 which engages in a longitudinal toothing 20 of the stop bolt 15. By means of a socket wrench insertable in the polygonal opening 21 of the stop bolt 18, the stop bolt 15 can be withdrawn from the toothing groove 16 and then the base plate 2 of the vice can be turned into the desired angular position, e.g., 15°, and then after removal of the socket wrench, the stop bolt 15 under pressure from the spring 17 re-engages in the corresponding toothing groove 16.

In the advantageous embodiment shown there is further provided on the gear rim 13 a graduated scale disc 22 which has on the circumference 23 an angular scale 24 (see FIG. 1), whereby the base plate 2 has on each side one sighting window 25 with null-mark 26 for this angular scale. This angular scale permits accurate adjustment of the machine vise to any desired angle.

The gear rim 13 and the graduated scale disc 22 are inserted in a suitable recess 27 in the base plate 2. For mounting the gear rim 13 combined with the bearing collar 5 and the scale disc 22 there is provided a bearing ring 28 tightly pressed into this recess 27 which is at least overlapped by the toothing of the gear rim.

It is also advantageous for the lower side of the gear rim 13 to be recessed in the central region at 29, so that this gear rim rests only on the machine table by a narrow outer ring surface 30. Since this ring surface has a greater diameter, this ensures that the bearing collar 5 stands accurately vertical on the machine table 4 when the screw 7 is tightened up, and therefore the base plate 2 can be freely rotated on the machine bed about the bearing collar 5. The tightening screw 7 advantageously takes the form of a socket-head screw so that this tightening screw can be brought into action or released by inserting a socket wrench into the polygonal opening 7a of the tightening screw.

Figure 4:
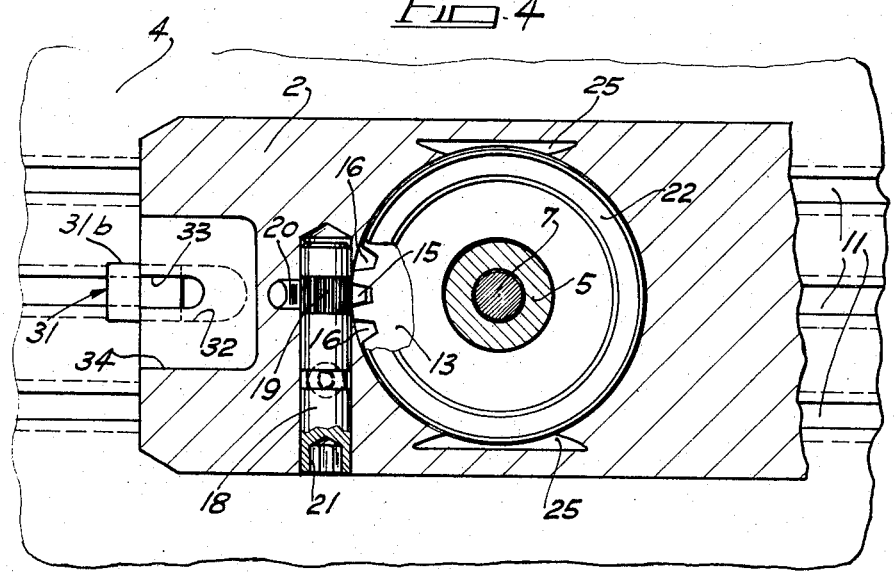
FIG. 4 is a horizontal partial section taken on the line IV/IV of FIG. 3.

The manipulation and operation of the already described machine vise are as follows:

The machine vise is assembled in the first place with the base plate 2 parallel to the T-grooves 11 on the machine table. To set up the vise, loose groove-blocks which are indicated as 31 in FIGS. 3 and 4, are slid into the longitudinal grooves 32 provided at both ends of the base plate 2 on its under side, said groove-blocks suitably having a T-section, whereby their lower portions 31a fit into the grooves 11 of the machine table and their upper portions 31b into the longitudinal grooves 32 of the base plate. After this accurate assembling of the vise in its zero-angle position, the holding screw 7a is tightened and the groove-blocks 31 are withdrawn from the longitudinal grooves 32. With the already-mentioned socket-wrench the swivel-bolt 18 is then turned and the stop bolt 15 is removed from the gear rim 13. The base plate 2 of the vise is then rotated about the fixed bearing collar 5 into the desired angular position, after which the stop bolt 15 is again engaged in the gear rim. The base plate 2 is thus locked in the desired angular position, after which, as illustrated in FIG. 2, the holding screw 9 is tightened up and therefore the base plate 2 is held fast on the machine table 4 by means of the holding paws 10 and the edge rails 1. In addition, the screw-ring 12 is tightened up and holds the central area of the base plate 2 tight on the machine table. This effectively prevents any riding up of the vise, i.e., any upward bending of the base plate resulting from high cutting pressures.

The base plate 2 may also be fixed in an angular position without provision of any grooves 16 in the gear rim 13. In this case the stop bolt 15 is lifted out of the gear rim with the swivel-bolt 18., and the base plate 2 is then turned into the desired angular position which can be read on the scale 24, after which, by tightening the screw-ring 12 the base plate 2 is pressed down relative to the bearing collar 5 and the base plate is thereby held tightly on the machine table 4. Additional fastening of the base plate is then achieved, as already described, by means of the holding screw 9 and the holding paws 10.

It can be seen particularly from FIGS. 3 and 4, that to fix the vise in its zero-angle position there are provided at both ends of the base plate 2 recesses 33, 34 for (not shown) tightening-screws which can be screwed into the groove-blocks of the machine table 4. The above-described machine vise, rotatable into different angular positions can therefore also be used in its basic position, i.e., the zero-angle position according to FIGS. 3 and 4. For this purpose, as already described, the base plate of the vise is accurately aligned by insertion of the groove-blocks 31 into the longitudinal grooves 32 of the base plate of the vise. These groove-blocks are then withdrawn and in their place female-threaded groove-blocks 8 are inserted in the grooves 11 of the machine table, and into each of the recesses 33, 34 on both sides of the base plate 2 a holding screw is inserted, screwed into the above-mentioned groove-blocks, and thereby fixes the ends of the base plate to the machine table. The screw-ring 12 is also tightened up, so that in this way in the mid-region of the base plate there is further fastening of the base plate to the machine table and thereby the above-mentioned riding-up at high cutting pressures is effectively prevented.

In swarf-removing machining with hot excessive cutting forces it may suffice to fix the base plate to the machine table in a given angular position solely by means of the screw-ring 12, so that the additional fixing of the base plate by the holding paws 10 is not essential.

I claim:

1. A machine vise for mounting on a machine table having a plurality of grooves therein each having inwardly extending flanges adjacent the upper edge thereof, comprising:

a base plate having laterally projecting edge rail means;

vise means mounted on said base plate;

a hollow cylindrical bearing collar adapted to support said base plate for rotation with respect to said machine table to a selected angular position, said bearing collar having means defining an external thread thereon;

means defining an externally threaded holding screw received in the interior of said hollow cylindrical bearing collar and being freely accessible from above, and holding screw including holding block means threadedly engaged therewith, said holding block means being received in one of said grooves on said machine table to effect a securement of said bearing collar to said machine table, said holding block means including means for permitting a movement of said holding block means longitudinally of said groove when said holding screw is loosened and for preventing an upward movement out of said groove;

an internally threaded nut threadedly engaged with said external thread on said bearing collar, said nut engaging the upper surface of said base plate so that said base plate will be clamped between said base plate and said machine table; and clamping means receivable in said grooves and including means for engaging said edge rail means so that said edge rail means of said base plate are clamped between said machine table and said edge rail engaging means.

2. A machine vise according to claim 1, including a gear ring having teeth thereon tightly fixed to said bearing collar, said gear ring having a lower side approximately flush with the lower surface of said base plate, and a movable stop member mounted in said base plate and being movable into and out of engagement with said gear ring.

3. A machine vise according to claim 2, wherein said lower side portion of said gear ring is recessed in its mid-region whereby only a narrow outer annular surface of said lower side of said gear ring rests on said machine table.

4. A machine vise according to claim 2, wherein said gear ring has a scale disc thereon and an angular scale on the periphery of said scale disc, and means defining sighting windows in said base plate with null marks for the angular scale.

5. A machine vise according to claim 2, wherein said stop member comprises a longitudinally movable, spring loaded stop pin having rack teeth thereon and said base plate includes means defining a spindle rotatably mounted thereon, said spindle extending at right angles to said stop pin and having pinion teeth engaging said rack teeth to enable withdrawal of said stop pin from engagement with said gear ring.

6. A machine vise according to claim 2 including a support ring received in means defining a recess of said base plate, said teeth of said gear ring overlapping said support ring whereby said gear ring is held within the base plate.

7. A machine vise according to claim 1, wherein said base plate has at each end longitudinal grooves in its under-side for the reception of groove blocks mounted in said grooves on said machine table.

8. A machine vise according to claim 7, wherein said base plate has at each end recesses for receiving clamping screws engageable with said groove blocks in said machine table to secure the base plate in its zero-angle position.

* * * * *